(12) United States Patent
Yang et al.

(10) Patent No.: US 6,481,895 B2
(45) Date of Patent: Nov. 19, 2002

(54) FLANGE BEARING

(75) Inventors: Qingmin Yang, Ann Arbor, MI (US); Robert L. Stone, Christiansburg, VA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/760,875

(22) Filed: Jan. 16, 2001

(65) Prior Publication Data

US 2002/0094143 A1 Jul. 18, 2002

(51) Int. Cl.$^7$ .................................................. F16C 9/02
(52) U.S. Cl. .......................... 384/294; 384/430; 384/123
(58) Field of Search ................................. 384/121, 123, 384/288, 294, 429, 430, 420, 275, 296

(56) References Cited

U.S. PATENT DOCUMENTS

| 2,179,860 | A |   | 11/1939 | Panzegrau et al. |   |
|---|---|---|---|---|---|
| 2,723,003 | A |   | 11/1955 | Antonsen |   |
| 3,121,596 | A |   | 2/1964 | Price |   |
| 3,361,502 | A |   | 1/1968 | Weinkamer et al. |   |
| 3,713,714 | A |   | 1/1973 | Hill et al. |   |
| 4,017,127 | A | * | 4/1977 | Smith et al. | 384/294 |
| 4,533,261 | A |   | 8/1985 | Losio |   |
| 4,599,147 | A |   | 7/1986 | Thompson |   |
| 4,652,150 | A |   | 3/1987 | New |   |
| 4,702,624 | A |   | 10/1987 | Fontana |   |
| 4,714,356 | A |   | 12/1987 | Damour et al. |   |
| 4,795,220 | A |   | 1/1989 | Mori |   |
| 4,989,998 | A |   | 2/1991 | Willis et al. |   |
| 5,114,246 | A |   | 5/1992 | Gowan |   |
| 5,139,348 | A |   | 8/1992 | Bryden et al. |   |
| 5,192,136 | A |   | 3/1993 | Thompson et al. |   |
| 5,529,399 | A | * | 6/1996 | Holze | 384/107 |
| 5,951,169 | A |   | 9/1999 | Oklejas et al. |   |
| 5,980,114 | A |   | 11/1999 | Oklejas, Jr. |   |

FOREIGN PATENT DOCUMENTS

| DE | 3736390 | * | 5/1989 |
| SU | 1328593 A1 |   | 8/1987 |

* cited by examiner

Primary Examiner—Thomas R. Hannon
(74) Attorney, Agent, or Firm—Reising, Ethington, Barnes, Kisselle, Learman & McCulloch, P.C.

(57) ABSTRACT

A crank shaft thrust bearing half includes a semi-cylindrical bearing shell carrying a pair of radially outwardly projecting thrust flanges having outer thrust surfaces. Radial grooves are formed in the thrust face to divide the surface into thrust pads. Each thrust pad has hydrodynamic contours which provide a hydrodynamic wedging action during rotation of the shaft to support high thrust loads. The thrust pad at the trailing end of the flange has an elevated land area spaced about 30° away from the trailing end and includes a long relief area from the land to the end to provide a no contact zone of the flange. Locating the land away from the trailing end and providing the relief zone shifts the peak pressure location away from the end and toward the middle of the bearing to relieve the trailing end from stress. Having radially oriented oil grooves with suitable width enables adequate oil supply and improved hydrodynamic oil film generating capability.

14 Claims, 4 Drawing Sheets

STRESS CONCENTRATION

US 6,481,895 B2

FLANGE BEARING

BACKGROUND OF THE INVENTION

1. Technical Field

This invention relates to crank shaft bearings of the type having side flanges for accommodating high thrust loads.

2. Related Art

It is common practice to support internal combustion engine crank shafts with journal bearings located at spaced points along the crank shaft. At least one of the bearings is designed to support axial thrust forces applied through the crank shaft. Such thrust bearings are made in bearing halves, each half bearing including a semi-cylindrical bearing shell having a concave inner running surface and a pair of axially spaced flanges projecting radially outwardly of the shell and having axially outwardly facing thrust bearing surfaces. The thrust surfaces seat against associated side surfaces of the crank shaft arms, such that the shaft is prevented from shifting in the axial direction during operation.

In some applications, there is considerable axial loading and measures must be taken to protect the thrust surfaces of the bearing. U.S. Pat. No. 5,192,136 discloses such a bearing, wherein the thrust face is formed with a plurality of oil supply grooves that subdivide the thrust bearing surface into a plurality of thrust pads. Each thrust pad is contoured to generate a protective hydrodynamic wedge film thrust support action, in order to separate the two opposing surfaces and to prevent metal-to-metal contact between the thrust face and under axial loading. The thrust bearing surface profile shown generally in FIG. 5 is in use. Such a prior art bearing is also illustrated in FIG. 7 of the present application. It has been found that in some installations, thrust bearings of the above type tend to distort under heavy clamping load, as illustrated schematically in FIG. 8, and the degree of distortion is constantly changing with changes in operating temperature and axial load conditions on the bearing. Studies of the load profile across the prior thrust bearing surface are illustrated in FIG. 9 of the present application. The profile shows that high loading is carried at points along the thrust face including a location of an extremely high pressure peak at the trailing end of the half bearing in relation to the direction of rotation of the crank shaft across the bearing surface. Over time, the heavy loading and cyclic distortion changes that occur can fatigue the trailing end of the thrust face where the flange meets the bearing shell. In severe cases, such fatigue can lead to delamination of the bearing layer material and/or cracking of the thrust flange at the trailing end where it meets the bearing shell.

It is an object of the present invention to overcome the shortcomings of prior hydrodynamic thrust bearings.

SUMMARY OF THE INVENTION AND ADVANTAGES

A half bearing for a rotary shaft includes a bearing shell having a concave running surface. At least one thrust flange extends radially from the shell and has an axially facing thrust bearing surface extending circumferentially in a sliding direction of the thrust bearing surface corresponding to the direction of rotation of the rotary shaft. The thrust bearing surface has a leading end and a trailing end relative to the sliding direction of the bearing surface. The thrust bearing surface includes a plurality of circumferentially spaced oil supply grooves which extend radially of the thrust bearing surface and subdivide the surface into a plurality of thrust bearing pads. The thrust bearing pads includes a leading pad disposed between the leading end and leading oil supply groove. The thrust pads include a trailing pad disposed between the trailing end and groove of the thrust bearing surface. Each thrust bearing pad has a hydrodynamic contour which includes an inclined ramp surface extending in the sliding direction, and a raised land surface following the inclined ramp surface in the sliding direction. According to the invention, the spacing between the trailing groove and trailing end is greater than the distance between the leading groove and leading end. The land surface of the trailing thrust bearing pad is spaced from the trailing end of the thrust bearing surface by distance greater than a distance between the land surface of the leading thrust bearing pad and the leading groove.

This construction of the thrust face according to the invention has the advantage of controlling the distribution of the hydrodynamic load imparted by the rotating crankshaft on the bearing. More specifically, spacing the land surface of the trailing thrust pad further from the trailing end has the advantage of shifting the peak high pressure location, which occurs at the land, away from the trailing end of the thrust flange, thereby isolating the otherwise problematic corner region of the trailing end which is prone to fatigue failure as described in the previous section. In other words, adjusting the relative location of the oil supply grooves and high pressure land regions enables a corresponding shifting of the peak pressure location away from the trailing end of the thrust bearing, overcoming the fatigue and delamination failure problems associated with the prior bearings discusses in the previous section. The oil groove design also enables adequate oil supply and better hydrodynamic film generation.

The invention has the further advantage of utilizing standard manufacturing techniques, coupled with controlled modification of the process, to yield a more reliable, high performance thrust bearing. Tests conducted on flange bearings constructed according to the present invention reveal that the subject thrust bearings are able to sustain a significantly higher average maximum load in use under severe testing conditions without experiencing high levels of localized torque, wear or fatigue failure associated with the prior hydrodynamic thrust bearing constructions operating under the same or comparable conditions.

BRIEF DESCRIPTION OF THE DRAWINGS

These and other features and advantages of the present invention will become more readily appreciated when considered in connection with the following detailed description and appended drawings, wherein:

FIG. 5b is an enlarged cross-sectional view taken along lines 5b—5bof FIG. 5a;

DETAILED DESCRIPTION

Figure 1:
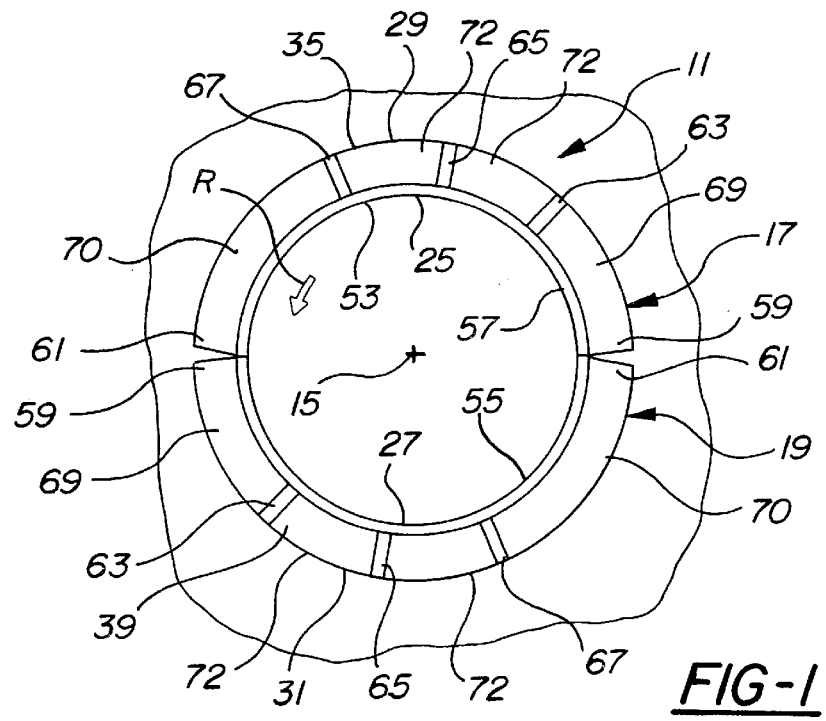
FIG. 1 is an end view of an upper and lower bearing assembly constructed according to the invention.
Figure 2:
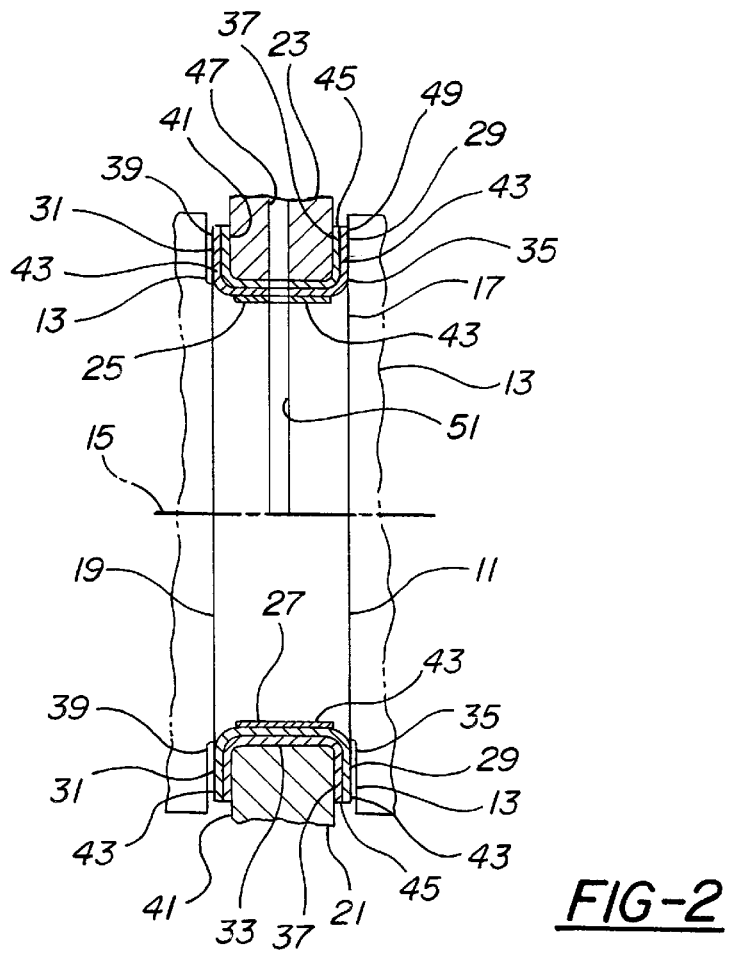
FIG. 2 is a cross-sectional view taken generally along lines 2—2 of FIG. 1.

FIGS. 1 and 2 show a bearing assembly 11 for rotatably supporting an engine crank shaft 13. The crank shaft 13 is supported for rotation around axis 15 in a predetermined direction of rotation R.

The bearing assembly 11 includes an upper half bearing 17 and a lower half bearing 19. The bearing halves 17,19 are collectively mounted as a unit on the lower end of an engine cylinder block by a cap structure 21. A pair of bolts extend through ears on the cap structure 21 into threaded bores in a cylinder block wall 23 to rigidly attach the bearing assembly 11 to the cylinder block in a known fashion.

The lower face of wall 23 has a semi-circular cavity or recess which mates with a semi-cylindrical wall or shell 25 of the upper half bearing 17, whereas the upper face of cap structure 21 has a semi-circular cavity or recess which mates with a semi-cylindrical wall or shell 27 of the lower half bearing 19. When the cap structure is bolted to the cylinder block, the two half bearings 17,19 are rigidly clamped to the cylinder block. Such mounting arrangement for the bearing assembly 11 is conventional.

The upper and lower bearing halves 17,19 are preferably identical in structure. For purposes of simplicity, details concerning the construction and features of the bearing halves 17,19 will be directed to the lower bearing half 19, it being understood that the same description is applicable to the upper half bearing 17.

The half bearing 19 has at least one and preferably two arcuate flange walls 29,31 extending radially outwardly and perpendicularly from an outer convex surface 33 of the bearing shell 27. The flange wall 29 has an external axially outwardly facing thrust bearing surface or face 35 and an axially inwardly facing surface 37. Thrust flange 31 likewise has an axially outer facing thrust bearing surface or face 39 and an axially inner facing surface 41. The inner surfaces 37,41 are substantially parallel. The outwardly facing surface 35,39 are also substantially parallel, apart from the hydrodynamic features to be described below. In the first illustrated embodiment, the side flanges 29,31 are formed as one integral piece with the bearing shell 27. The bearing half 19 is formed into the generally conventional half thrust bearing configuration in part by conventional practice wherein the bearing half material is blanked from a strip which preferably is of a bi-metal construction wherein a relatively soft low friction sliding or bearing material, e.g., preferably but not limited to an aluminum-lead alloy is applied to a rigid steel backing. In the drawings, the bearing liner material is designated by numeral 43, and the steel backing layer is designated by numeral 45. The blanked strip is formed in one or more operations to provide the general shape of the bearing half 19, including the semi-cylindrical shell 27 and arcuate flanges 29,31.

Pressurized lubricating oil is supplied to the bearing assembly through a hole or port 47 in the cylinder block wall 23. A mating slot or hole 49 in the shell 25 of the upper bearing half 17 delivers the oil to a groove 51 formed in the concave running surface 53 of the shell 25. As the crank shaft 13 rotates around the shaft axis 15 in the direction of arrow R, the oil is carried by the rotating shaft surface onto the concave running surface 55 of the shell 27 of the lower bearing half 19. In this fashion, a ring of oil encircles the shaft surface to provide hydrodynamic radial support for the shaft 13. The concave surfaces 53,55 of the upper and lower shells 25,27 serve as radial bearing surfaces for the shaft 13.

Referring again to the lower half bearing 19, the shell 27 intersects the flanges 29,31 to provide a recessed corner 57 which may be chamfered, flat or rounded. Rotation of the shaft 15 drags oil along the recessed corner to provide added lubrication to the bearing surfaces.

The axially outer facing surface 35 of the flange 29 extends circumferentially in a sliding direction R which corresponds to the direction of rotation of the shaft 15. With reference to the sliding direction R, the axially outer facing surface 35 has a leading end 59 at one end of the thrust flange 29, and a trailing end 61 at the circumferentially opposite end of the thrust flange 29. Thus, as the shaft 13 rotates and oil is directed onto the axially outer facing surface 35, it passes first over the leading end 59 and is carried in the sliding direction R toward the trailing end 61.

The axially outer facing surface 35 is formed with a plurality (i.e., two or more) of oil supply grooves. In the illustrated preferred embodiment, there are three such grooves and they are designated in the drawings by the reference numerals 63, 65 and 67, respectively. The groove 63 is adjacent the leading end 59 and thus is designated the leading oil supply groove. Oil supply groove 67 is associated with the trailing end 61, and thus is designated the trailing end groove. The remaining groove 65 is located between the leading and trailing grooves 63,67 and thus will be designated the intermediate groove.

Figure 3:
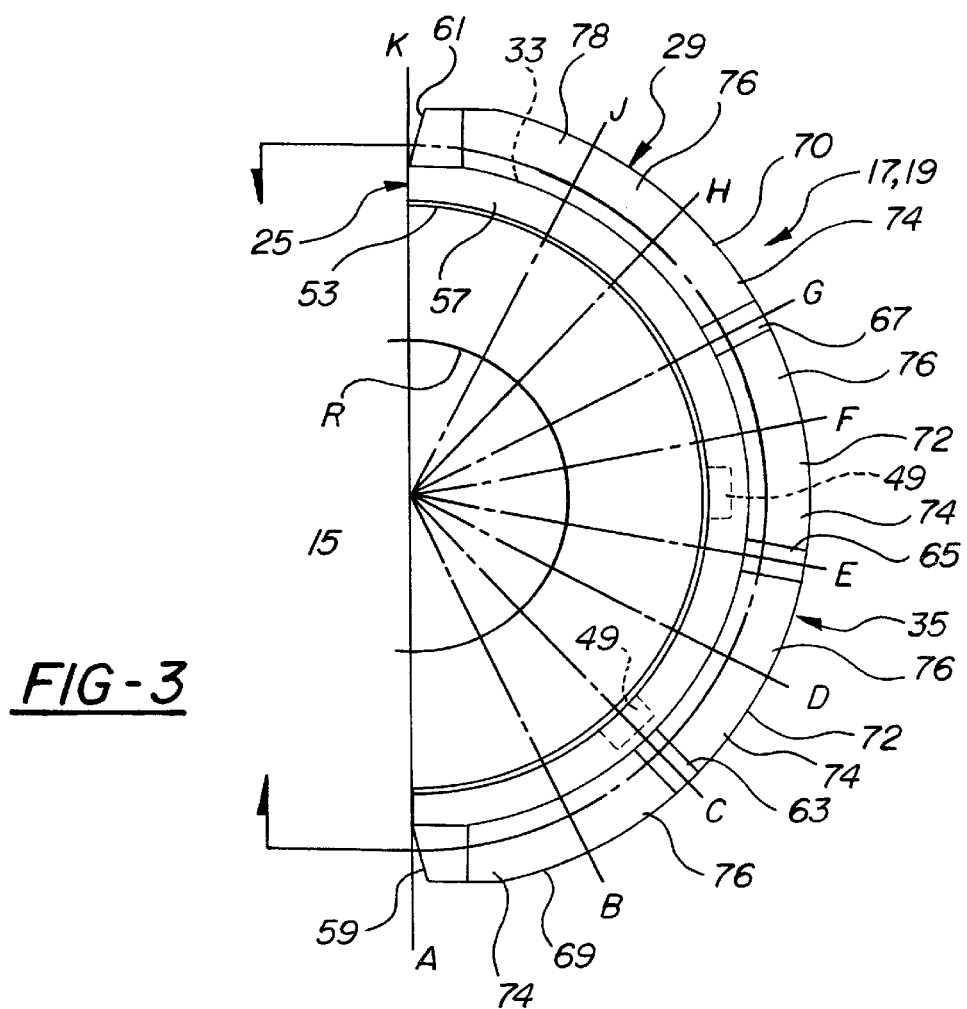
FIG. 3 is a enlarged end view of one of the half bearings of the assembly of FIG. 1 illustrating further features.
Figure 4:
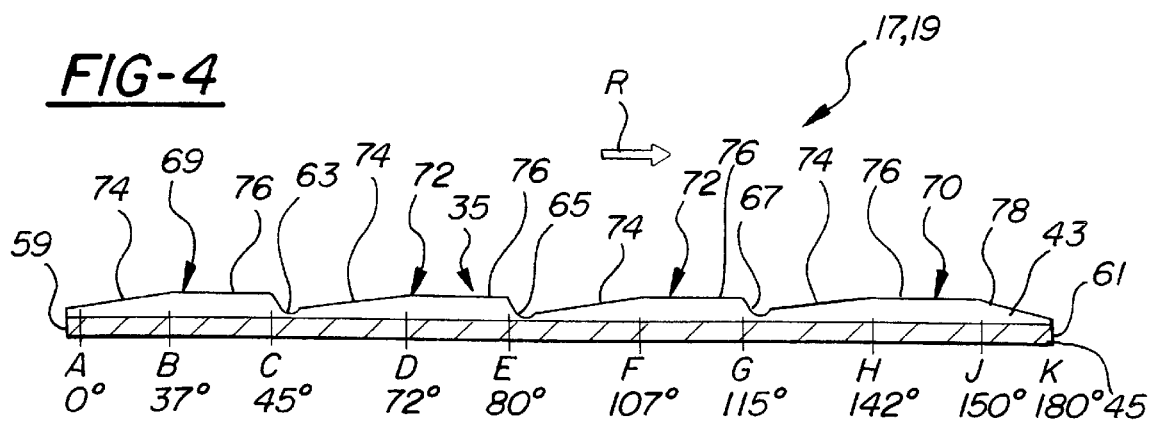
FIG. 4 is an enlarged cross-sectional taken along lines 4—4 of FIG. 3.

As best shown in FIGS. 3 and 4, the grooves 63, 65, 67 each have an axis that passes through the center of the respective grooves. The axes, and thus the grooves 63,65 and 67, extend radially of the shell 27 across the axially outer facing surface 35, and thus are non-parallel to one another. It will be seen from FIG. 3 that the axes of the grooves intersect at the axial center line of the bearing assembly 11, which corresponds to the axis 15 of rotation of the crank shaft 13. The grooves 63, 65 and 67 are preferably narrow in relation to conventional grooves of the type disclosed in the aforementioned U.S. Pat. No. 5,192,136, which is incorporated herein by reference. The width of the grooves is preferably on the order of about 0.05–0.16 inches wide and have a depth of about 0.01–0.03 inches and are preferably formed entirely in the liner layer 43 as so as not to extend through the liner to the backing 45.

The grooves 63, 65 and 67 are spaced circumferentially apart from one another and from the ends 59,61 of the axially outer facing surface 35. The preferred relative spacing of the grooves with respect to one another and with respect to the ends is illustrated best in FIG. 3 and is expressed in degrees relative to the leading end 59, with the overall circumferential length of the outer surface 35 being 180°. In FIG. 3, the locations of the axes of the grooves 63, 65 and 67 are designated by the letters C, E and G, respectively. It will be seen that the grooves 63, 65 and 67 are spaced equally from one another, preferably at a spacing of about 35° between their axes. It will also be seen that the leading groove 63 is closer to the leading end 59 than is the trailing groove 67 to the trailing end 61. For reasons that will become more apparent below, the grooves are shifted toward the leading end 59 to provide a greater circumferential length of the outer surface 35 between the trailing groove 67 in the trailing end 61. Preferably, the leading groove 63 is spaced about 45° from the leading end 59, whereas the trailing groove 67 is spaced about 65° from the trailing end 61.

Referring now more particularly to FIG. 4, a greatly exaggerated profile of the axially outer surface 35 is shown in which the hydrodynamic features are emphasized. It will be seen from FIGS. 3 and 4 that the grooves 63, 65 and 67 subdivide the axially outer facing thrust bearing surface 35 into a plurality of thrust bearing pads which are separated by the grooves. As shown in these two figures, there are four such thrust bearing pads and they include a leading thrust bearing pad 69 extending between the leading end 59 and leading groove 63, a trailing thrust bearing pad 70 extending between the trailing groove 67 and the trailing end 61 and one or more (in this case two) intermediate thrust bearing pads 72 disposed between the leading and trailing grooves 63,67 and any intermediate grooves 65 therebetween.

Each thrust bearing pad 69, 70 and 72 is contoured to induce hydrodynamic support action, sometimes referred to as film wedge hydrodynamic action, to the thrust surface 35 suitable for handling relatively high thrust loads to prevent or minimize metal-to-metal contact between the thrust surface 35 and the shaft 13. As the shaft rotates, oil is drawn across the thrust face 35 and is forced into narrowing spaces formed between the thrust face 35 and an opposing thrust shoulder of the shaft. To achieve the hydrodynamic effect, each thrust bearing pad is provided with an inclined ramp surface 74 that extends in the direction of inclination with the sliding direction R of the shaft 13 across the thrust face 35. The ramp 74 of the intermediate and trailing thrust pads 72,70 preferably has a height of about 0.002–0.004 inches. The ramp surface 74 at the leading thrust bearing pad 69 has a height of about 0.002–0.006 inches. The length of the ramp surface 74 on the leading thrust bearing pad 69, given in degrees, is about 37°. The length of the ramp 74 in the intermediate and trailing thrust bearing pad 72,70 is about 27°.

Figure 9:
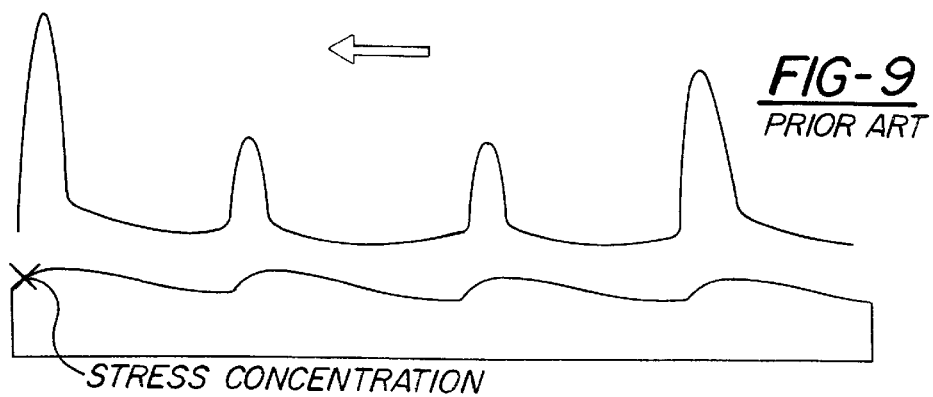
FIG. 9 is a schematic representation of the prior art surface profile and resultant hydrodynamic pressure profile across the surface in operation.
Figure 10:
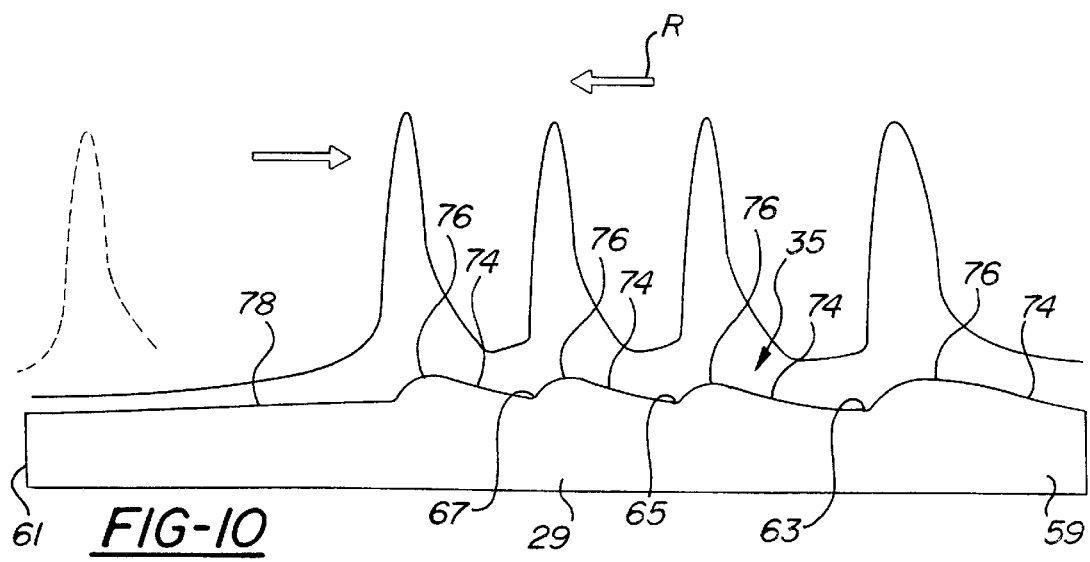
FIG. 10 is a comparative surface and hydrodynamic pressure profile of a bearing constructed according to the invention.

In each thrust bearing pad 69, 70 and 72, the inclined ramp 74 transitions into an elevated land area 76 which preferably is flat and planar. The width of the land area for each pad is preferably about 8° or less. The land 76, in turn, transitions into the grooves 63, 65 and 67, except for the land 76 of the trailing thrust bearing pad 70. Preferably, the land 76 of the leading thrust bearing pad 69 and the intermediate thrust bearing pads 72 transition abruptly into their leading and intermediate grooves 63,65 in the sliding direction R. In such case, there is no spacing between the point where the land 76 terminate and the grooves 63,65 begin. The invention does contemplate, however, a transition between the lands 76 and grooves 63,65. However, the trailing thrust bearing pad 70 is provided with a declining relief ramp area 78 that extends from the land 76 to the trailing end 61. The relief area 78 spans preferably about 30° from the end of the land 76 to the trailing end 61, such that the trailing end 61 resides at a level below the land 76 of the trailing thrust bearing pad 70. Referring to FIG. 10, the resultant hydrodynamic pressure profile is illustrated by way of comparison to the prior art profile of FIG. 9. In FIG. 10, the spacing of the land 76 from the trailing end 61 along with the declining relief ramp 78 provides a "no contact" zone of the flange adjacent the trailing end 61. Consequently, the pressure peak location at the land 76 is spaced substantially from the trailing end 61 (by about 30° or more) which acts to locate the peak hydrodynamic load inwardly of the trailing end 61 to relieve localized stress at the trailing end 61 of the flange 29. It will be seen from FIG. 10 that the pressure profile peaks are about equal in magnitude across the lands 76, avoiding sharp concentrations at the ends, and particularly the trailing end 61 according to the prior profile of FIG. 3.

Figure 5A:
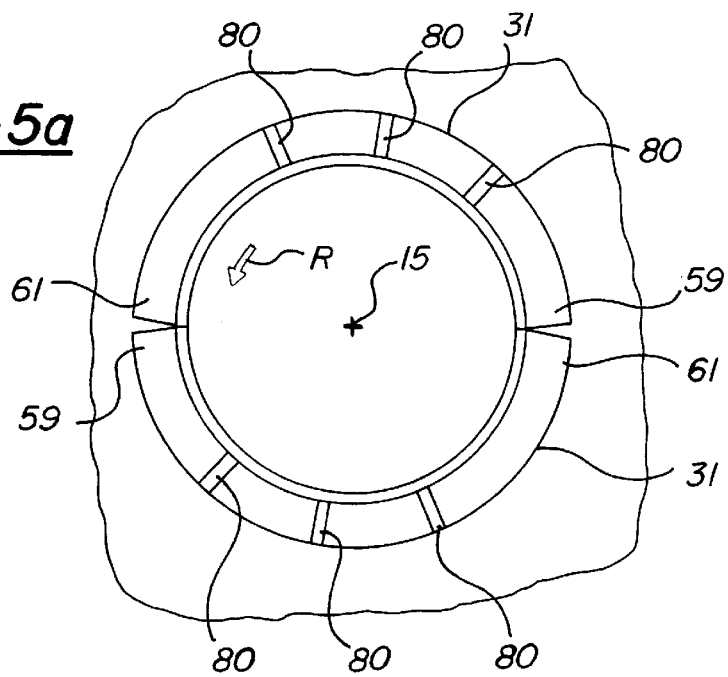
FIG. 5a is an end view of the bearing assembly of FIG. 1, but of the opposite side.
Figure 5B:
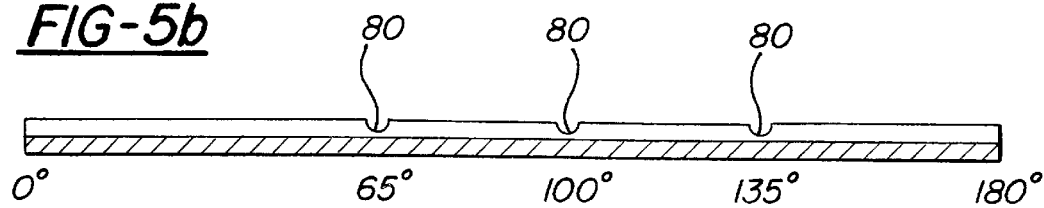

FIG. 5a shows the opposite side of the bearing assembly 11 as that seen in FIG. 1, and thus the flanges 31 of the upper and lower bearing halves 17,19 are shown. The grooves 80 may be identical in location, size and orientation to the grooves 63, 65 and 67. However, as shown in FIG. 5b, the surface regions between adjacent grooves 80 and between the endmost grooves 80 on the ends of the thrust pad are substantially planar and do not incorporate the hydrodynamic ramp and land features of the opposite flange 29. Moreover, while a particular groove configuration 80 is shown in FIGS. 5a and 5b, the invention contemplates more or less grooves (e.g., five such grooves 80) or alternative groove configurations, such as parallel thumbnail-style grooves shown in U.S. Pat. No. 5,192,136, the disclosure of which is incorporated herein by reference. The grooves 80 serve to channel lubricating oil across the flanges 31.

Figure 6:
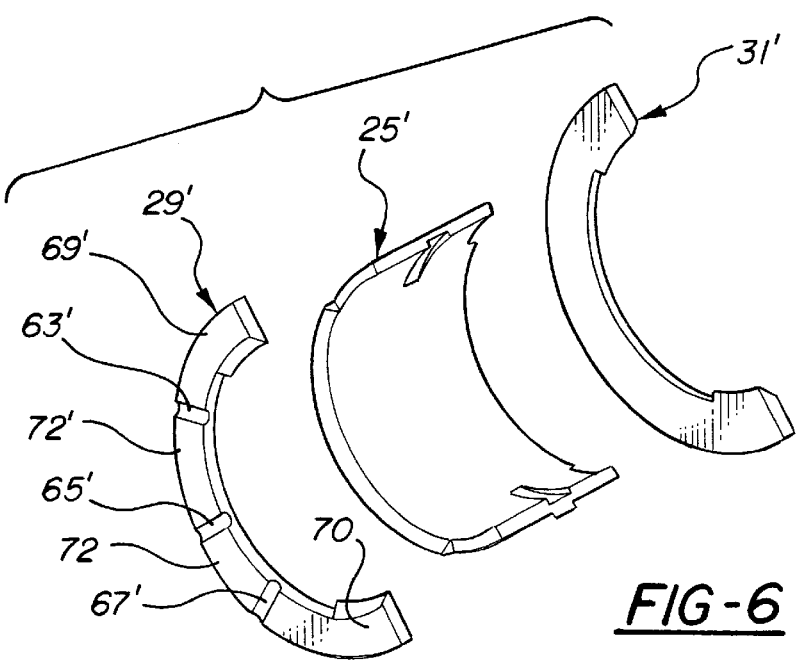
FIG. 6 is another embodiment of a thrust bearing assembly according to the invention.
Figure 7:
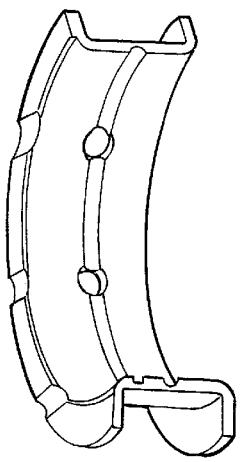
FIGS. 7 and 8 are perspective and top elevation views, respectively, of a prior art half bearing.
Figure 8:
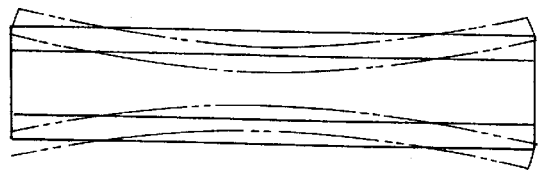

Referring now to FIG. 6, an alternative embodiment 11' of the bearing assembly is shown, wherein everything is the same as described above with respect to the first embodiment except that the flanges 29' and 31' are formed separately from the shell 25,27. The same reference numerals are used to designate like features, but are primed. The flanges 29',31' are connected by any suitable means to achieve a unitized structure such as in the manner disclosed, for example, in U.S. Pat. No. 4,714,356, the disclosure of which is incorporated herein by reference. While this patent discloses welding the flanges 29',31' to the shell 27', other conventional joining processes may be used, for example providing radial lugs on the flanges which engage in slots at the edges of the shell, such as shown in U.S. Pat. No. 3,713,714 also incorporated herein by reference.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A half bearing for a rotary shaft having a direction of rotation, comprising:

a bearing shell having a concave running surface;

at least one thrust flange extending radially from said shell having an axially facing thrust bearing surface extending circumferentially in a sliding direction of said thrust bearing surface corresponding to the direction of rotation of the rotary shaft, said thrust bearing surface having a leading end thereof at one end of said thrust flange and a trailing end thereof at a circumferentially opposite end of said thrust flange relative to said sliding direction;

a plurality of circumferentially spaced radially extending oil supply grooves formed in said thrust bearing surface in non-parallel relation to one another, a leading one of said oil supply grooves being disposed in circumferentially spaced adjacent relation to said leading end of said thrust bearing surface, a trailing one of said oil supply grooves being disposed in circumferentially spaced relation to said trailing end of said thrust bearing surface, said oil supply grooves subdividing said thrust bearing surface into a plurality of thrust bearing pads including a leading thrust bearing pad between said leading end and said leading oil supply groove and a trailing pad between said trailing oil supply groove and said trailing end, each thrust bearing pad having a hydrodynamic contour including an inclined ramp surface extending in said sliding direction of said thrust bearing surface and a raised land surface following said inclined ramp surface in said sliding direction; and wherein said circumferential spacing between said trailing oil supply groove and said trailing end is greater than said circumferential spacing between said leading end and said leading oil supply groove and said land surface of said trailing thrust bearing pad is spaced circumferentially from said trailing end of said thrust bearing surface by a distance greater than a distance between said land surface of said leading thrust bearing pad and said leading groove.

2. The half bearing of claim 1 wherein said thrust bearing surface extends circumferentially 180 degrees and said land of said trailing thrust bearing pad is spaced 30 degrees from said trailing end.

3. The half bearing of claim 1 wherein there are three of said oil supply grooves.

4. The half bearing of claim 3 wherein said oil supply grooves are equally spaced from one another.

5. The half bearing of claim 1 wherein said thrust bearing surface extends circumferentially 180 degrees and said trailing oil supply groove is spaced about 65 degrees from said trailing end.

6. The half bearing of claim 1 wherein there are three of said oil supply grooves and four of said thrust bearing pads.

7. The half bearing of claim 1 wherein said trailing thrust bearing pad includes a recessed relief area extending from said land surface to said trailing end.

8. The half bearing of claim 7 wherein said recessed relief area has a circumferential length and said inclined ramp surface of said trailing thrust bearing pad has a circumferential length, said length of said recessed area being greater than said length of said inclined ramp surface of said trailing thrust bearing pad.

9. The half bearing of claim 8 wherein said thrust bearing surface extends circumferentially 180 degrees and said recessed relief area extends circumferentially about 30 degrees from said trailing end.

10. The half bearing of claim 1 wherein there are three of said oil supply grooves spaced equally from one another each having a radial axis, said axis of said leading oil supply groove being spaced about 45 degrees from said leading end, and said axis of said trailing oil supply groove being spaced about 65 degrees from said trailing end.

11. The half bearing of claim 1 including a second flange projecting radially outwardly of said shell having an outer axial thrust bearing face.

12. The half bearing of claim 11 wherein said thrust bearing face of said second thrust flange lacks said hydrodynamic features of said thrust bearing surface of said one thrust flange.

13. The half shaft of claim 12 wherein said thrust bearing surface of said second thrust flange includes a plurality of oil supply grooves.

14. A half bearing for a rotary shaft, comprising:

a bearing shell having a concave running surface;

a pair of thrust flanges formed as one piece with said shell and extending radially outwardly of said shell each having an axially outwardly facing thrust bearing surface;

a first plurality of radially extending circumferentially spaced oil supply grooves provided in said thrust bearing surface of one of said thrust flanges having groove axes that are non-parallel; and a second plurality of circumferentially spaced oil supply grooves provided in said thrust bearing surface of the other of said thrust flanges having groove axes that are non-parallel to one another, wherein said first plurality of said oil supply grooves subdivide said thrust bearing surface of said one thrust surface into a plurality of thrust bearing pads, said thrust bearing pads having a hydrodynamic contour formed thereon, and said second plurality of said oil supply grooves subdivide said thrust bearing surface of said other of said thrust flanges into a plurality of associated thrust bearing pads which are substantially planar and lacking said hydrodynamic contour of said one thrust flange.

* * * * *